(12) United States Patent
Riihioja

(10) Patent No.: US 8,986,506 B2
(45) Date of Patent: Mar. 24, 2015

(54) SHOE PRESS BELT

(75) Inventor: Vesa-Matti Riihioja, Tampere (FI)

(73) Assignee: Valmet Technologies, Inc., Tampere (FI)

( * ) Notice: Subject to any disclaimer, the term of this patent is extended or adjusted under 35 U.S.C. 154(b) by 0 days.

(21) Appl. No.: 13/977,258

(22) PCT Filed: Jan. 30, 2012

(86) PCT No.: PCT/FI2012/050076
§ 371 (c)(1),
(2), (4) Date: Jun. 28, 2013

(87) PCT Pub. No.: WO2012/104480
PCT Pub. Date: Aug. 9, 2012

(65) Prior Publication Data
US 2013/0269895 A1     Oct. 17, 2013

(30) Foreign Application Priority Data

Jan. 31, 2011 (FI) .................................. 20115099

(51) Int. Cl.
*D21F 3/02* (2006.01)
*D21G 1/00* (2006.01)
*D21F 3/00* (2006.01)
*B29C 41/20* (2006.01)

(52) U.S. Cl.
CPC ............... *D21F 3/00* (2013.01); *D21F 3/0227* (2013.01); *D21F 3/0236* (2013.01); *B29C 41/20* (2013.01); *D21G 1/006* (2013.01); *Y10S 162/901* (2013.01)
USPC ..................... 162/358.4; 162/358.3; 162/901; 442/333; 442/414

(58) Field of Classification Search
CPC ....... D21F 3/00; D21F 3/0227; D21F 3/0236; B29C 41/20
USPC ................... 162/358.1–358.4, 900–901, 348; 442/328, 333, 358, 374, 414
See application file for complete search history.

(56) References Cited

U.S. PATENT DOCUMENTS

| 4,161,470 A | * | 7/1979 | Calundann .................... 524/599 |
| 5,405,685 A | | 4/1995 | Patel |
| 5,607,757 A | | 3/1997 | Dalton |
| 5,736,471 A | | 4/1998 | Thielemann et al. |
| 6,165,614 A | | 12/2000 | Stiller et al. |
| 6,284,102 B1 | | 9/2001 | Inoue et al. |

(Continued)

FOREIGN PATENT DOCUMENTS

| DE | 43 28 029 A1 | 2/1995 |
| WO | WO 2010/066950 A2 | 6/2010 |
| WO | WO 2012104480 A1 * | 8/2012 |

OTHER PUBLICATIONS

May 24, 2012 International Search Report issued in International Patent Application No. PCT/FI2012/050076.

(Continued)

*Primary Examiner* — Jose Fortuna
(74) *Attorney, Agent, or Firm* — Oliff PLC

(57) ABSTRACT

A shoe press belt, and a method for manufacturing and using it. The press belt comprises a base formed of heat-resistant elastomer, inside which base there is a support structure comprising a plurality of support yarns. At least some of the support yarns are heat-resistant polymer yarns, the polymer structure of the material of which comprises a naphthalene group.

6 Claims, 3 Drawing Sheets

(56) References Cited

U.S. PATENT DOCUMENTS

| | | | |
|---|---|---|---|
| 7,254,934 B2 * | 8/2007 | Wu | 57/241 |
| 7,527,709 B2 * | 5/2009 | Lippi Alves Fernandes et al. | 162/358.4 |
| 7,550,061 B2 * | 6/2009 | Walkenhaus et al. | 162/358.1 |
| 7,935,225 B2 * | 5/2011 | O'Brien et al. | 162/289 |
| 8,002,950 B2 * | 8/2011 | Quigley | 162/348 |
| 8,028,509 B2 * | 10/2011 | Okumura et al. | 57/243 |
| 8,197,372 B2 * | 6/2012 | Wu et al. | 474/263 |
| 8,328,990 B2 * | 12/2012 | Quigley | 162/348 |
| 8,568,567 B2 * | 10/2013 | Hagfors et al. | 162/358.4 |
| 2001/0021437 A1 | 9/2001 | Sakuma et al. | |
| 2004/0261884 A1 | 12/2004 | Rydin | |
| 2006/0213174 A1 * | 9/2006 | Wu | 57/237 |
| 2007/0215304 A1 * | 9/2007 | Lippi Alves Fernandes et al. | 162/358.4 |
| 2007/0251660 A1 | 11/2007 | Walkenhaus et al. | |
| 2009/0318047 A1 | 12/2009 | Bruning et al. | |
| 2011/0005700 A1 * | 1/2011 | O'Brien et al. | 162/289 |
| 2011/0059287 A1 * | 3/2011 | McAmish | 428/87 |
| 2011/0272112 A1 * | 11/2011 | Aberg et al. | 162/289 |
| 2012/0132384 A1 * | 5/2012 | Hagfors et al. | 162/358.2 |
| 2013/0269895 A1 * | 10/2013 | Riihioja | 162/202 |

OTHER PUBLICATIONS

Sep. 9, 2011 Finnish Search Report issued in Finland Patent Application No. 20115099 (with translation).

May 24, 2012 Written Opinion issued in International Patent Application No. PCT/FI2012/050076.

* cited by examiner

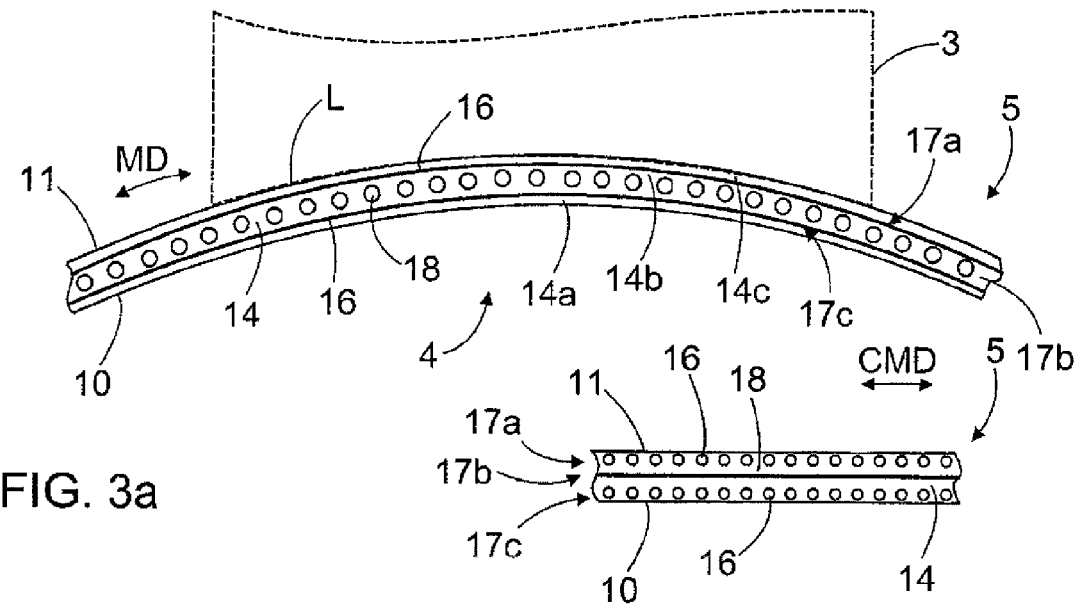
FIG. 3a
FIG. 3b
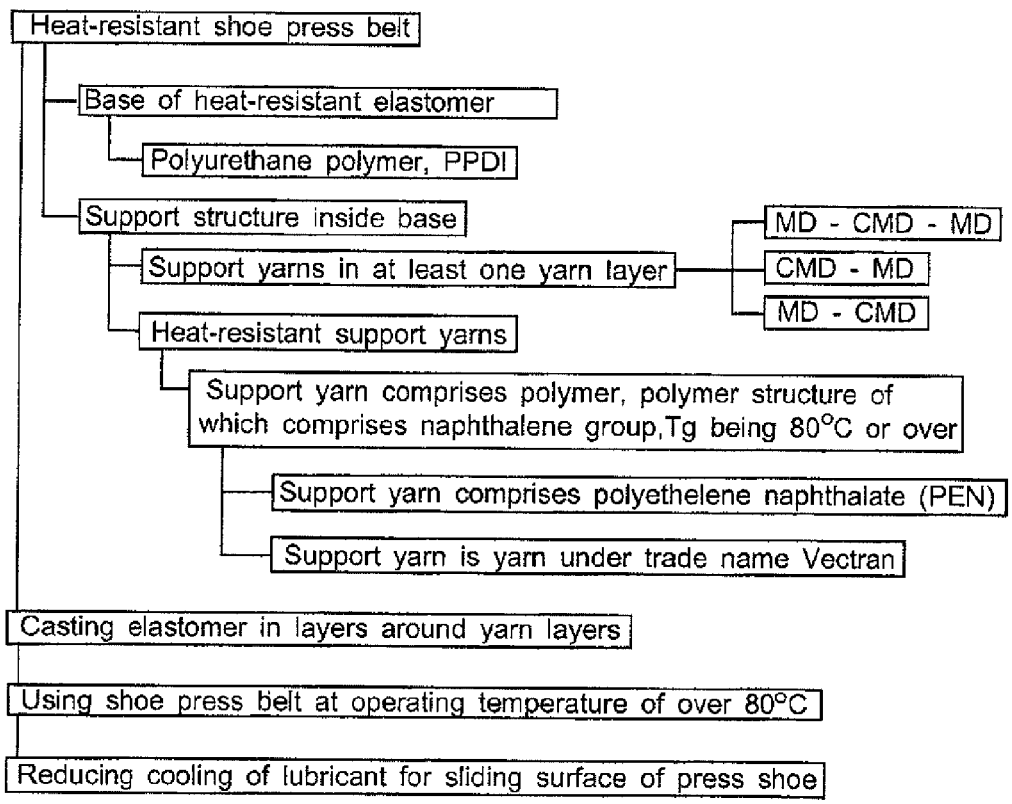
FIG. 4

SHOE PRESS BELT

BACKGROUND OF THE INVENTION

The invention relates to a shoe press belt which may be used in shoe presses of press sections of board, paper and pulp machines and in a shoe press of the calender of a paper machine. A shoe press belt is an independent belt-like piece with a shape of an endless loop. The shoe press belt has a base of an elastomeric material, and a support structure comprising support yarns inside the base.

Further, the invention relates to a method for manufacturing a shoe press belt and to the use of such a belt in a shoe press.

In chemical pulp, board and paper machines, shoe presses may be used for removing water from a fibre web. In such shoe presses, one surface of the wet fibre web travelling at a high speed is pressed with a rotating press roll at the same time as a second surface of the fibre web is pressed with an immobile press shoe surrounded by an endless press belt. The inner surface of the press belt slides against a sliding surface of the press shoe. As a result of this sliding, the temperature of the press belt rises. Therefore, shoe presses are typically provided with a lubrication assembly with which lubricating oil can be supplied between the belt and the press shoe to reduce generation of friction and heat. The heat resistance of press belts has, however, turned out insufficient.

BRIEF DESCRIPTION OF THE INVENTION

An object of this invention is to provide a shoe press belt of a novel type, a method for manufacturing it, and use of a shoe press belt of a novel type.

The press belt according to the invention is characterized in that at least some of the support yarns are heat-resistant polymer yarns, the polymer structure of the material of which comprises a naphthalene group, and that the force required for a 2-% stretch of said heat-resistant polymer yarn is at least 10 cN/tex, 20° C.

The method according to the invention is characterized by using, in the support structure, heat-resistant support yarns which are polymer yarns, the polymer structure of the material of which comprises a naphthalene group, and with which support yarns the force required for a 2-% stretch is at least 10 cN/tex, 20° C.

The use according to the invention is characterized in that a press belt according to independent claim 1 is arranged in a shoe press and run through a long nip between the press shoe and the press roll, allowing an operating temperature of more than 80° C.

An idea is that the press belt has a base manufactured of a heat-resistant material, inside which a support structure is arranged that comprises a plurality of heat-resistant support yarns. The heat-resistant support yarn is of such a polymer whose polymeric structure comprises a naphthalene group. The yarn comprising such a material has a relatively great force resisting the stretch, in other words its yield strength is high. Further, this strength property is preserved at a raised temperature. Thus, the heat-resistant support yarn is selected to be a polymer yarn with which the force required for a 2-% stretch is 10 cN/tex, 20° C., or greater than that.

An advantage is that the press belt of the novel type is suitable for use at a temperature higher than before. The shoe press can thus be run at a higher operating temperature. This allows the running speed and compression pressure of the shoe press to be increased to improve the efficiency of the shoe press. Further, as the press belt withstands higher temperatures without getting damaged, it becomes possible to reduce the cooling of the lubricant supplied between the press shoe and the press belt.

The idea of an embodiment is that the glass transition temperature Tg of said heat-resistant polymer yarn is at least 80° C.

The idea of an embodiment is that the glass transition temperature Tg of said heat-resistant polymer yarn is at least 100° C.

The idea of an embodiment is that said heat-resistant polymer yarn comprises polyethylene naphthalate (PEN). The molecule structure of this material is shown below. As can be observed, the material comprises a naphthalene group that is shown as a pair of benzene rings in the structural figure.

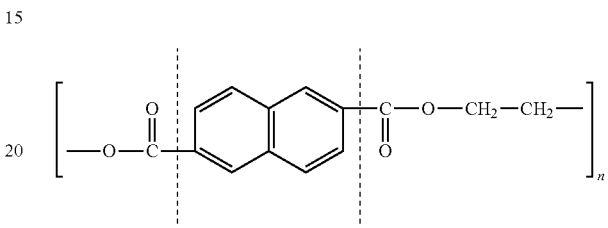

The idea of an embodiment is that said heat-resistant polymer yarn is of polyethylene naphthalate (PEN). The glass transition temperature Tg of polyethylene naphthalate is 120° C., whereby the strength properties of the PEN yarn are preserved well also at a raised temperature. Proportioned to the linear density, the breaking strength of polyethylene naphthalate is about 60 cN/tex. The stretch value with a stretch of 2% and at a temperature of 20° C. is more than 16 cN/tex, which is, for example, about twofold compared with the corresponding value of polyester comprising polyethylene terephthalate (PET), which is commonly used as a support yarn. The stretch force of polyethylene naphthalate is also at a temperature of 100° C. about twofold compared with polyethylene terephthalate. Thus, the material is strong and tough and preserves its properties well also at raised temperatures. Further, a support yarn made of polyethylene naphthalate has turned out to have good strength properties against cross-direction pressing of the yarn, in other words it has cross-directions elasticity, owing to which the support yarn is highly resistant to cross-direction impacts and stresses without breaking.

The idea of an embodiment is that said heat-resistant support yarn is a copolymer comprising polyethylene naphthalate and one or more second polymers suitable for the purpose.

The idea of an embodiment is that the structure of said heat-resistant polymer yarn is of completely aromatic liquid crystalline polymer, poly(4-hydroxybenzoic acid-co-6-hydroxy-2-naphthoic acid). The molecule structure of such a material is shown below. As can be observed, the material comprises a naphthalene group that is shown as a pair of benzene rings in the structural figure.

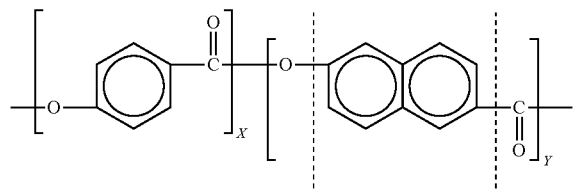

The idea of an embodiment is that said heat-resistant polymer yarn is heat-resistant yarn under the trade name Vectran. The glass transition temperature Tg of such a support yarn is 110° C. or even higher, in other words the yarn preserves its properties also at fairly high temperatures. Further, such a yarn has an extremely great strength because the force required for a 2-% stretch of the yarn is up to 100 cN/tex, 20° C. or greater than that. In an experiment, a stretch value of 2%, 115 cN/tex, 20° C. was measured for the yarn.

The idea of an embodiment is that at least the yarns of a support yarn layer closest to the surface on the side of the press shoe are disclosed heat-resistant support yarns. This is because the support yarns closest to the press shoe are subjected to the greatest thermal stress from the sliding surface. Between the yarn layers farther from the sliding surface and a first surface to be arranged against the sliding surface, there is a greater thickness of base material, which insulates heat transfer in the structure, protecting thus the support yarns positioned farther away. The support yarns closest to the sliding surface of the press shoe may be in the machine direction or in the cross-direction relative to the press belt.

The idea of an embodiment is that the press belt may comprise at least one machine-direction support yarn layer and at least one cross-machine-direction support yarn layer. At least the support yarns of the machine-direction yarn layer closest to the surface on the side of the press shoe are disclosed heat-resistant support yarns. The machine-direction support yarns are subjected to greater stresses, for instance tensile stresses, during operation, due to which their durability may be critical with regard to the condition and service life of the press belt.

The idea of an embodiment is that the support structure of the press belt comprises at least one support fabric. The support fabric comprises disclosed heat-resistant yarns. If required, all yarns of the support fabric may be disclosed heat-resistant yarns.

The idea of an embodiment is that all support yarns of the support structure of the press belt are disclosed heat-resistant yarns.

The idea of an embodiment is that all support yarns of the press belt are of polyethylene naphthalate (PEN) or yarns marketed under the trade name Vectran.

The idea of an embodiment is that the base of the press belt comprises polyurethane polymer made of a urethane prepolymer containing isocyanate groups and of a chain extender. In manufacturing the urethane prepolymer, 1,4-phenylene diisocyanate (PPDI) has been used, and the chain extender comprises methyl-bis(3-chloro-2,6-diethylaniline) (MCDEA). MCDEA is, in the field, also referred to as 4,4'-methylene-bis(3-chloro-2,6-diethylaniline). Urethane prepolymer refers to a product obtained from a reaction between said 1,4-phenylene diisocyanate monomer (PPDI) and a polyol. To make an urethane prepolymer, PPDI is reacted with a polyol. The polyol used may be any polyol commonly used in making polyurethanes. Thus, the polyol may be, for example, polyether polyol, polyester polyol, polyether carbonate polyol, polycarbonate polyol or polycaprolactam polyol. When, in addition to symmetrical PPDI, a chain extender containing symmetrical MCDEA is used for making polyurethane, the heat-resistance properties of a shoe press belt made of such a polyurethane are excellent. For example, the breaking strength of the belt is preserved at a raised temperature, and other properties of the polyurethane belt, such as wear resistance and recovery from compression, may also be improved. For the sake of clarity, this polyurethane polymer may, in this application, be also called PPDI urethane.

The idea of an embodiment is that the press belt is manufactured in a casting drum by using centrifugal casting. Hence, support yarns are first placed on the inner surface of the casting drum and then, while the drum is rotating, a polyurethane material or a corresponding elastomer is uniformly applied around and onto the support yarns. There may be several yarn layers, in which case after arranging each yarn layer, a new centrifugal casting may be carried out in the casting drum. Thus, the yarn layers are not in contact with each other but there is cast elastomer between them.

The idea of an embodiment is that the press belt is manufactured in a casting drum by using centrifugal casting. First, a first casting layer is cast from a heat-resistant elastomer. The first casting layer may be cast without support yarns or with support yarns. After that, cross-machine-direction yarns are arranged and a second casting layer is cast. The machine-direction support yarns may be arranged at the same time as the second casting layer is cast. Finally, yet one or more coating layers may be cast.

The idea of an embodiment is that the base of the press belt is manufactured by casting heat-resistant elastomer onto a casting cylinder. As the support yarns in the circumferential direction, above-mentioned polymer yarns may be used which have a structure of completely aromatic liquid crystalline polymer, poly(4-hydroxybenzoic acid-co-6-hydroxy-2-naphthoic acid). Further, the heat-resistant support yarns in the circumferential direction may be yarns which are marketed under the trade name Vectran and have a glass transition temperature Tg of at least 110° C., the force required for a 2-% stretch of the yarn being at least 100 cN/tex, 20° C.

The idea of an embodiment is that the support structure inside the base is a non-woven structure in which the support yarns do not cross and bind to each other.

BRIEF DESCRIPTION OF THE FIGURES

Some embodiments will be explained in more detail in the attached drawings, in which

FIGS. 3a and 3b show schematically a cross-section of a part of a press belt and its support structure;

FIG. 4 illustrates, as a simplified diagram, features disclosed in this application.

In the figures, some embodiments are shown in a simplified manner for the sake of clarity. Like reference numerals identify like elements in the figures.

DETAILED DESCRIPTION OF SOME EMBODIMENTS

Figure 1:
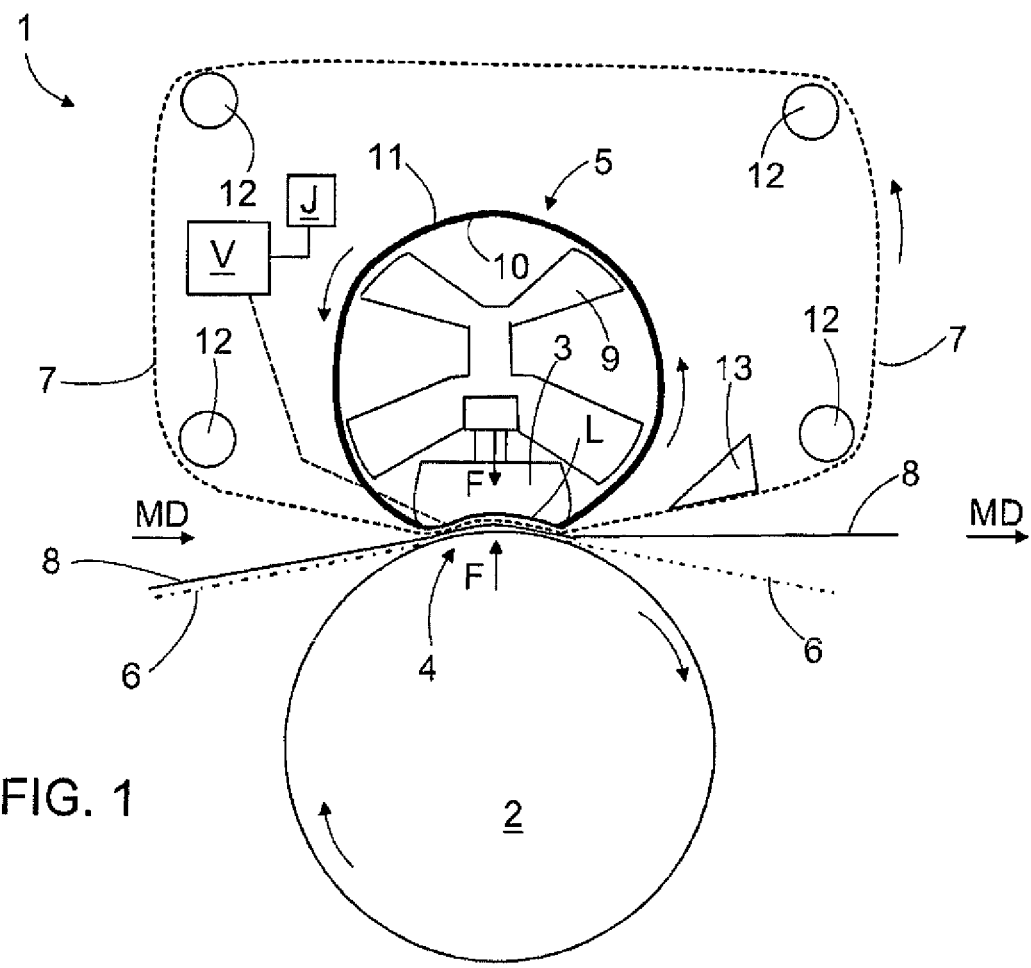
FIG. 1 shows schematically the principle of a shoe press.

FIG. 1 shows a simplified shoe press 1 which may comprise a press roll 2 and a press shoe 3, between which there is a press zone 4 through which a press belt 5, at least one paper machine fabric 6, 7 and a fibre web 8 to be dried may be arranged to be run in the machine direction MD. The press shoe 3 and the press roll 2 may be pressed against each other with a force F, whereby the press belt 5, the paper machine fabric 6, 7 and the fibre web 8 run between them are compressed. The press shoe 3 has a curved sliding surface L facing the press roll 2, whereby there is an extended contact area, i.e. what is called a long nip, between the press shoe 3 and the press roll 2. The press belt 5 may be arranged to pass around the press shoe 3, supported by an appropriate support member 9. An inner surface 10 of the press belt 5 slides against the sliding surface L of the press shoe 3, and an outer surface 11 of the belt faces the fibre web 8. The fibre web 8 may be brought to the press zone 4 in such a way that it is supported by one or more paper machine fabrics, such as a press felt 7 or a wire 6. The paper machine fabric 6, 7 may be run in such a way that it is guided by guide rolls 12 or the like. In the embodiment according to FIG. 1, the upper paper machine fabric may be a press belt 7 and the lower fabric may be a wire 6. When the fibre web 8 passes through the relatively long press zone 4 formed by the press roll 2 and the press shoe 3, water is pressed out of it which may be received by the press felt, from which the water may be removed by a water collecting device 13, for instance.

Between the sliding surface L of the press shoe 3 and the inner surface 10 of the press belt 5, there is friction, and it is possible to try to reduce it by supplying lubricant between the press shoe 3 and the press belt 5 by means of a lubrication system V. Oil, for example, may be used as the lubricant. The friction between the sliding surface L and the press belt 5 generates heat which heats the lubricating oil of the press shoe 3 and also raises the temperature of the press belt 5. The lubrication system V may comprise a cooling system J to cool the lubricant. The cooled lubricant allows generation of heat in the sliding surface L and heat transfer to the press belt 5 to be reduced. The intention of cooling the lubricant is to ensure that the temperature of the press belt 5 will not rise over the allowed operating temperature, which is typically approximately 60 to 70° C. However, the cooling consumes a large amount of energy. Further, the cooling equipment J complicates the structure of the shoe press 1 and requires maintenance. In objects of use in a warm climate, in particular, arranging the cooling of the lubricant has turned out rather problematic. The press belt 5 that is presented in this application and comprises heat-resistant elastomer and heat-resistant support yarns is designed to withstand a temperature of more than 80° C. and even a temperature of more than 100° C. without the strength properties of the press belt 5 essentially changing. The use of such a heat-resistant press belt 5 in the shoe press 1 allows the cooling of the lubricant to be reduced or even the cooling to be eliminated completely. As a result, the energy efficiency of the shoe press 1 may be improved and, in addition, it may even be possible to simplify the construction of the shoe press 1.

It is to be noted that the press belt disclosed in this application is also applicable to shoe presses different from the one shown in FIG. 1. What is common to different embodiments is that the press belt is always a component which is manufactured separately and has a shape of an endless loop, and which is arranged or may be arranged in a shoe press in such a way that it passes through a long nip between at least one roll and the press shoe, contributing thus to the treatment of a fibre web.

Figure 2:
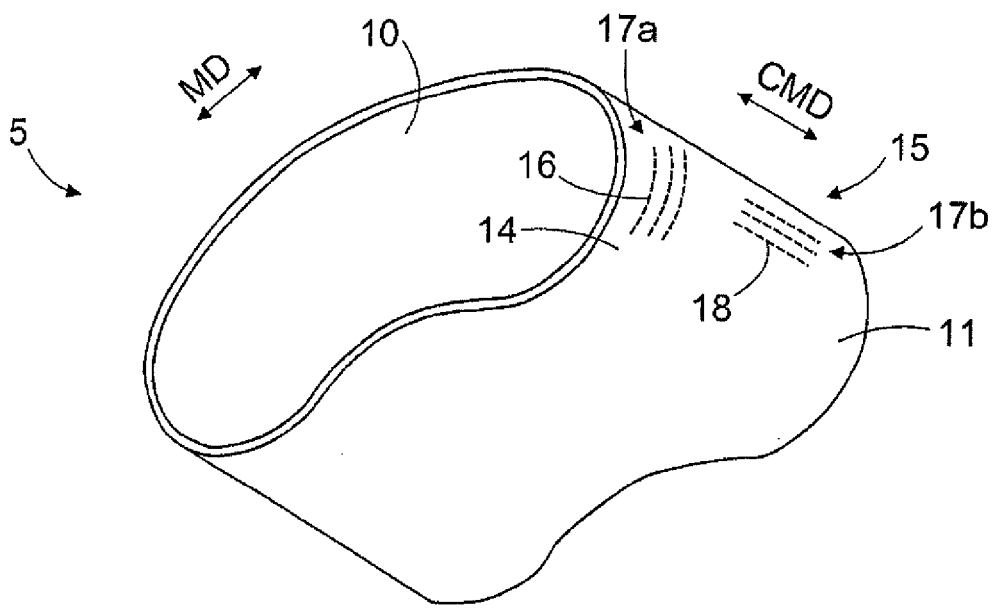
FIG. 2 shows schematically a press belt which is an independent component that is manufactured separately, has a shape of a closed loop and may be mounted on a shoe press.

FIG. 2 shows a press belt 5 of a shape of an endless loop, having an inner surface 10 and an outer surface 11. The press belt 5 may be arranged in the shoe press 1 such that its outer surface 11, i.e. the second surface, faces the fibre web 8 while its inner surface 10, i.e. the first surface, slides against the sliding surface of the press shoe 3. FIG. 2 also illustrates, by broken lines, a support structure 15 which is positioned inside the base 14 and which may comprise a yarn layer 17a comprising several machine-direction MD support yarns 16, and a yarn layer 17b comprising several cross-machine-direction CMD support yarns 18. There may be one, two, three or more yarn layers 17. The number of yarn layers 17 and the mutual order of the machine-direction yarn layers 17a and the cross-machine-direction yarn layers 17b can be selected according to the need.

The structure of a press belt 5 is shown in FIG. 3a in sectional view in the machine direction MD and in FIG. 3b in sectional view in the cross-machine direction CMD. The presented structure comprises three support yarn layers 17a, 17b, 17c, arranged in such a way that the machine-direction yarn layers 17a and 17c are in the outermost position, and between them there is the middle cross-machine-direction yarn layer 17b. Such a support structure 15 has turned out good. Alternatively, the support structure 15 may be of a different kind, and it may comprise one, two, three or more yarn layers on top of each other, and the mutual order and directions of the yarn layers may be designed case-specifically. Each yarn layer 17 comprises several adjacent yarns, which may be separate support yarns or, alternatively, one or more support yarns may be bound spirally side by side in a yarn layer. The yarn layers 17 on top of each other may be separate from one another, in which case there is elastomer belonging to the base 14 between the yarn layers. The material of the base 14 may be PPDI urethane disclosed in this application. In some cases, the support structure 15 may also be a fabric, in which case it may be considered to form one yarn layer. The support yarns of the support structure 15 may be monofilaments or multifilaments.

The yarn layer 17a closest to the press shoe 3 is, due to the friction generated on the sliding surface L, subjected to the greatest thermal stress. Thus, heat-resistant support yarns may be arranged at least in this layer. Since the machine-direction yarns are subjected to the greatest stresses during operation, heat-resistant yarns may, if required, be used as all machine-direction support yarns. If there is a cross-machine-direction yarn layer closest to the press shoe 3 in the support structure 15, heat-resistant support yarns may be used in the cross-machine direction. Further, all support yarns of the support structure 15 may be heat-resistant yarns. Heat-resistant support yarns refer to support yarns disclosed in this application, the polymer structure of the material of these yarns comprising a naphthalene group. The support yarn may thus comprise polyethylene naphthalate (PEN), in other words it is either completely of polyethylene naphthalate or is one of its copolymers. Further, the heat-resistant support yarn may comprise liquid crystalline polymer (LCP) which is marketed under the trade name Vectran. If the support structure has also yarns other than disclosed heat-resistant support yarns, the material of these yarns may be, for example, polyethylene terephthalate (PET), polyamide, polypropylene or polyethylene.

Press belts are subjected to great stresses due to both compression and, in particular, bending in different directions in the press zone. These stresses may cause cracks to the base material of the belt which gradually make the belt unusable. Further, in a paper machine, fibre bundles may be generated which, while passing through the press, generate sudden deformation forces which may break the press belt. Further, fibre bundles may generate permanent elongations and bulges in the belt. Therefore, the support yarns must have a sufficiently high yield limit, which is typically determined, in the case of polymer yarns, by means of stretch force. If a fibre bundle, for example, generates in the press belt and its support yarns deformation that locally exceeds the yield limit, permanent elongation remains in the support yarns, and a bulge remains in the press belt. A stretch value of 16 cN/tex with a 2-% stretch and at a temperature of 20° C. has been designed for the PEN yarn. A force greater than this may cause permanent deformation in the yarn. In practice, it has been noted that the stretch value should be at least 10 cN/tex with a 2-% stretch, 20° C. Further, the glass transition temperature Tg of the PEN yarn is 120° C. The glass transition temperature of the heat-resistant yarn should be at least 100° C., whereby the material preserves its properties well at a raised temperature of the shoe press, i.e. at over 80° C., even at over 100° C. The glass transition temperature Tg refers to reversible change of the non-crystalline (amorphous) part of a polymer from rubber-like or tough state into hard and brittle.

The shoe press belt disclosed in this application may be manufactured by using various manufacturing techniques. The press belt may be manufactured by means of what is called centrifugal casting in a drum. In such a case, the cross-machine-direction and machine-direction support yarns may be first placed on the inner surface of the casting drum and then, while the drum is rotating, the PPDI urethane or the like heat-resistant elastomer is uniformly applied around and onto the yarns. Further, it is feasible to cast the construction in such a way that a first heat-resistant urethane layer is cast with support yarns or without support yarns, after which the cross-machine-direction support yarns are arranged, followed by casting of a second urethane layer and simultaneous positioning of the machine-direction support yarns in the construction, and subsequently yet one or more urethane layers may be cast in the casting drum, which layers cover the structural layer comprising the machine-direction yarns. To illustrate casting layers of the base 14, layers are denoted with reference numerals 14a to 14c in FIGS. 3a, 5a and 5b.

Alternatively, the press belt may be manufactured by casting it onto a casting cylinder. In this arrangement, the machine-direction support yarns are first arranged upon the casting cylinder and subsequently elastomer material is cast onto the cylinder while the cylinder is rotating, at the same time as the support yarn in the circumferential direction is coiled up onto the machine-direction yarns. Yet a third possibility is to manufacture the press belt in such a way that the basic fabric is impregnated with an elastomer in a cylindrical mould, whereby the basic fabric is placed between the outer casing and the mandrel of the mould. Negative pressure is sucked into the mould, after which the base material is injected into the mould. The elastomeric material is thus uniformly absorbed into the basic fabric. The shoe press belt may also be manufactured by impregnating and/or coating a support structure that is woven, braided or laminated endless on both sides with a heat-resistant elastomer.

Figure 5A:
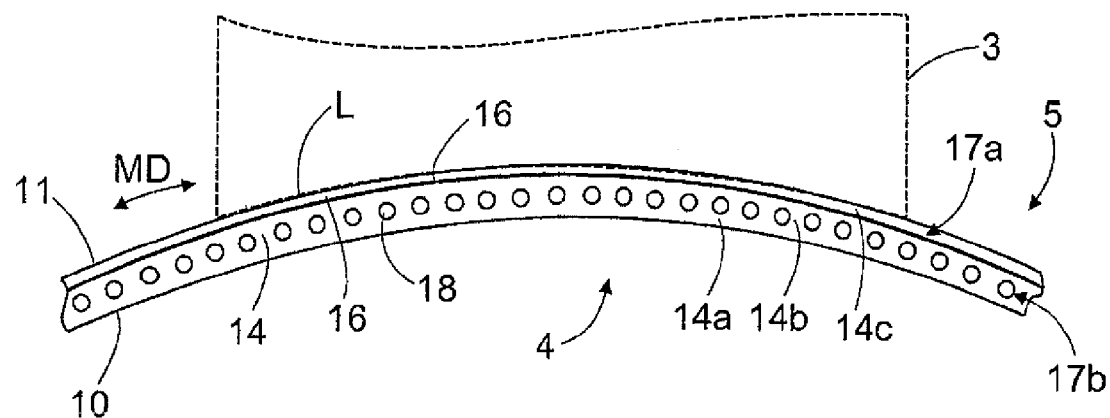
FIGS. 5a and 5b further show schematically a cross-section of some alternative ways to arrange the support yarn layers and elastomer layers in the press belt.
Figure 5B:
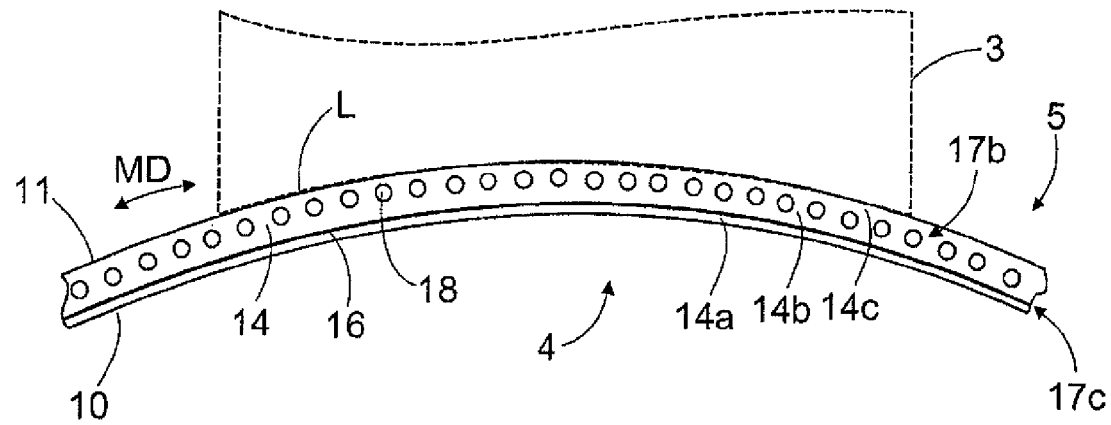

The embodiments shown in FIGS. 5a and 5b may, for the most part, correspond to the above embodiments. The difference as compared with the embodiment of FIG. 3a is the number and mutual order of the yarn layers 17a to 17c belonging to the support structure 15. Cross-machine-direction CMD and machine-direction MD elongation may be generated in the press belt 5, due to fibre bundles, for example. Cross-machine-direction deformation may, to some extent, be compensated for during operation by tightening the shoe press belt in the cross-machine-direction but, by contrast, compensating for a machine-direction deformation is difficult. Therefore, there is reason to use heat-resistant support yarns disclosed in this application as the machine-direction yarns. The cross-machine-direction yarns may also be such heat-resistant yarns or, in some cases, they may be of another material. In FIG. 5b, for instance, closest to the sliding surface L there is the cross-machine-direction yarn layer 17b that may in some cases be formed of ordinary support yarns. If cross-direction elongation is generated in the belt 5, the belt may be tightened in the cross-machine direction by moving the fastening members in the shoe press unit away from one another. The embodiments of FIGS. 5a and 5b may be manufactured by casting in a drum or also by using other manufacturing techniques mentioned above.

In some cases, features disclosed in this application may be used as such, irrespective of other features. On the other hand, when necessary, features disclosed in this application may be combined to provide different combinations.

The drawings and the related description are only intended to illustrate the idea of the invention. The details of the invention may vary within the scope of the claims.

The invention claimed is:

1. A shoe press belt which is an independent piece with a shape of an endless loop, runnable in a shoe press through a long nip between at least one roll and a press shoe, the shoe press belt comprising:
   a base which is of an elastomeric heat-resistant material;
   a plurality of polymeric support yarns arranged in at least one yarn layer inside the base; and
   a first surface on the side of the press shoe, and a second surface on the side of a fibre web,
   wherein at least some of the support yarns are heat-resistant polymer yarns, the polymer structure of the material of which comprises a naphthalene group,
   wherein the structure of said heat-resistant polymer yarn comprises completely aromatic liquid crystalline polymer, the completely aromatic liquid crystalline polymer being poly(4-hydroxybenzoic acid-co-6-hydroxy-2-naphthoic acid) and the glass transition temperature Tg of said polymer material is at least 110° C.,
   wherein the shoe press belt is impermeable, and
   wherein the force required for a 2-% stretch of said heat-resistant polymer yarn is at least 10 cN/tex, 20° C.

2. The shoe press belt as claimed in claim 1, wherein the force required for a 2-% stretch of the yarn being at least 100 cN/tex.

3. The shoe press belt as claimed in claim 1, wherein
   at least the support yarns of the yarn layer closest to the first surface on the side of the press shoe are heat-resistant yarns.

4. The shoe press belt as claimed in claim 1, wherein
   the press belt comprises at least one machine-direction yarn layer and at least one cross-machine-direction yarn layer; and
   at least the support yarns of the machine-direction yarn layer closest to the first surface on the side of the press shoe are disclosed heat-resistant yarns.

5. The shoe press belt as claimed in claim 1, wherein
   the base comprises heat-resistant polyurethane polymer.

6. The shoe press belt as claimed in claim 1, wherein
   the base comprises heat-resistant polyurethane polymer, and
   the polyurethane polymer is made of urethane prepolymer containing isocyanate groups and of a chain extender mixture, whereby 1,4-phenylene diisocyanate is used for making the urethane prepolymer, and the chain extender mixture comprises over 25% by weight methyl-bis(3-chloro-2,6-diethylaniline).

* * * * *